United States Patent
Itoh (10) Patent No.: US 10,970,012 B2
(45) Date of Patent: Apr. 6, 2021

(54) IMAGE FORMING APPARATUS, A NON-TRANSITORY COMPUTER-READABLE RECORDING MEDIUM STORING PRINT CONTROL PROGRAM, PRINT CONTROL METHOD

(71) Applicant: SHARP KABUSHIKI KAISHA, Sakai (JP)

(72) Inventor: Kenji Itoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/596,247

(22) Filed: Oct. 8, 2019

(65) Prior Publication Data

US 2020/0117403 A1 Apr. 16, 2020

(30) Foreign Application Priority Data

Oct. 11, 2018 (JP) .............................. JP2018-192310

(51) Int. Cl.
 *G06F 3/12* (2006.01)
(52) U.S. Cl.
 CPC .......... *G06F 3/1222* (2013.01); *G06F 3/1238* (2013.01); *G06F 3/1267* (2013.01); *G06F 3/1294* (2013.01)
(58) Field of Classification Search
 CPC .. G06F 3/1222; G06F 3/1238; H04N 1/00859
 See application file for complete search history.

(56) References Cited

U.S. PATENT DOCUMENTS

| | | | | |
|---|---|---|---|---|
| 5,408,478 A | * | 4/1995 | Ohmori | G06F 11/1008 369/53.35 |
| 6,542,253 B1 | * | 4/2003 | Kim | G06F 3/1212 358/1.15 |
| 8,880,832 B2 | * | 11/2014 | Namba | G06F 3/0611 711/167 |
| 2003/0044009 A1 | * | 3/2003 | Dathathraya | G06F 21/6218 380/55 |
| 2007/0242301 A1 | * | 10/2007 | Tsuchie | H04N 1/4406 358/1.14 |
| 2008/0158574 A1 | * | 7/2008 | Sugiyama | G06F 3/1208 358/1.1 |
| 2009/0086252 A1 | * | 4/2009 | Zucker | G06F 21/6281 358/1.14 |
| 2010/0150600 A1 | * | 6/2010 | Oyoshi | H04N 1/00891 399/88 |
| 2011/0188876 A1 | * | 8/2011 | Arakawa | G03G 15/20 399/70 |

FOREIGN PATENT DOCUMENTS

JP 2007-079692 A 3/2007

\* cited by examiner

*Primary Examiner* — King Y Poon
*Assistant Examiner* — Michael Burleson
(74) *Attorney, Agent, or Firm* — ScienBiziP, P.C.

(57) ABSTRACT

An image forming apparatus includes a warning mode to issue an alert when a human detection sensor detects a person while the image forming apparatus is in an operation mode. When a central processing unit has received print data from an external device during the warning mode, the central processing unit stores the received print data in a storage device. The central processing unit executes print processing for the stored print data when the warning mode has been released.

11 Claims, 7 Drawing Sheets

IMAGE FORMING APPARATUS, A NON-TRANSITORY COMPUTER-READABLE RECORDING MEDIUM STORING PRINT CONTROL PROGRAM, PRINT CONTROL METHOD

BACKGROUND

The present invention relates to an image forming apparatus, a non-transitory computer-readable recording medium storing a print control program, and a print control method. In particular, the present invention relates to an image forming apparatus, a non-transitory computer-readable recording medium storing a print control program, and a print control method, each of which includes a human detection sensor and can set a warning mode. The warning mode issues an alert when the human detection sensor detects a person.

Japanese Laid-Open Patent Application 2007-79692 discloses one example of the background art. A multifunctional peripheral (MFP), according to Japanese Laid-Open Patent Application 2007-79692, can applied for an anti-crime system and works as a monitoring unit. The MFP includes a sensor to detect a human body and is connected with a control device via a network. Also, this MFP includes a device to notify the control device of a detection result.

The technology, which Japanese Laid-Open Patent Application 2007-79692, discloses serves to prevent a crime but merely detects an intruder and gives notice. Therefore, if a printed material such as facsimile (FAX) reception or printer reception is left in the MFP (i.e. image forming apparatus), the intruder may take away the printed material and may look in content of the printed material. Then, confidential information or personal information, each of which the printed material contains, may be leaked.

The present invention is directed to provide a novel image forming apparatus, a non-transitory computer-readable recording medium storing a novel print control program, and a novel print control method. Also, the present invention is directed to provide an image forming apparatus, a non-transitory computer-readable recording medium storing, and a print control method, each of which can properly prevent the information contained in the printed material from being leaked.

SUMMARY

The first aspect of the present invention is an image forming apparatus which includes a human detection sensor and can set a warning mode to issue an alert when the human detection sensor detects a person. The image forming apparatus includes a reception device that receives print data from an external device, a data storage device that stores the print data when the reception device has received the print data during the warning mode, a control device that executes print processing for the print data stored in the data storage device, linked with time to release the warning mode.

In the first aspect of the present invention, the image forming apparatus includes a warning mode to be set in an energy-saving state during the night and in the other state. The warning mode sends an alert message to other devices such as a manager terminal and issues the alert, for example an alert audio is output from a speaker, when the human detection sensor has detected a person. Also, the image forming apparatus includes the reception device that receives the print data such as FAX data and printer data from an external device and temporarily stores the print date in the date storage device when the receiving device has received the print date during the warning mode. The control device executes the print processing for the stored print data, linked with time to release the warning mode.

According to the first aspect of the present invention, business operation runs smoothly without any troubles due to delay in printing and a leakage of information contained in a printed material is properly prevented.

The second aspect of the present invention is the image forming apparatus according to the first aspect of the present invention, wherein a period, during which the warning mode is on, is preset to a predetermined period linked with business operation time of a user.

The third aspect of the present invention is the image forming apparatus according to the first aspect of the present invention, wherein a period, during which the warning mode is on, can be changed.

The fourth aspect of the present invention is the image forming apparatus according to the first aspect of the present invention. The image forming apparatus includes a notification device that notifies other device when an amount of the print data, stored in the data storage device, has reached or has exceeded a predetermined value.

The fifth aspect of the present invention is the image forming apparatus according to the first aspect of the present invention. The image forming apparatus includes a transfer device that transfers at least a part of the print data to other storage device when an amount of the print data, stored in the data storage device, has reached or has exceeded a predetermined value.

The sixth aspect of the present invention is the image forming apparatus according to the first aspect of the present invention, wherein the control device starts the print processing when the warning mode has been released.

The seventh aspect of the present invention is the image forming apparatus according to the first aspect of the present invention, comprising a print time calculation device that calculates time required for the print processing based on an amount of the print date stored in the date storage device, wherein the control device executes the print processing so that the print processing ends, linked with the time to release the warning mode, based on the time which the print time calculation device has calculated.

The eighth aspect of the present invention is the image forming apparatus according to the first aspect of the present invention. The image forming apparatus includes a confidentiality determination device that determines the existence of confidentiality for the print data stored in the data storage device, wherein the control device executes the print processing for the print data, linked with the time to release the warning mode, when the confidentiality determination device has determined that the print data possesses confidentiality, and wherein the control device executes the print processing for the print data, whether or not during the warning mode, when the confidentiality determination device has determined that the print data possesses no confidentiality.

The ninth aspect of the present invention is an image forming apparatus which includes a human detection sensor and can set a warning mode to issue an alert when the human detection sensor detects a person. The image forming apparatus includes a reception device that receives print data and a warning mode release signal from an external device, a data storage device that stores the print data when the reception device has received the print data during the warning mode, and a control device that releases the warning mode and executes print processing for the print data stored in the data storage device, linked with time to release the warning mode, when the reception device has received the warning mode release signal.

According to the ninth aspect of the present invention, business operation runs smoothly without any troubles due to delay in printing and a leakage of information contained in a printed material is properly prevented.

The tenth aspect of the present invention is the image forming apparatus according to the first aspect of the present invention. The image forming apparatus includes an identification device that identifies a type of the print data, wherein the control device determines whether the print processing is executed while the warning mode is released, based on the type of the print data which the identification device has identified.

The eleventh aspect of the present invention is a non-transitory computer-readable recording medium storing a print control program which an image forming apparatus executes, wherein the image forming apparatus includes a human detection sensor and can set a warning mode to issue an alert when the human detection device detects a person. The print control program causes a processor included in the image forming device to implement receiving print data from an external device, storing the print data which the receiving receives when the receiving has been executed during the warning mode, and printing the print data stored in the storing, linked with time to release the warning mode.

The twelfth aspect of the present invention is a print control method of an image forming apparatus which includes a human detection sensor and can set a warning mode to issue an alert when the human detection sensor detects a person. The print control method of the image forming apparatus includes receiving print data from an external device, storing the print data which the receiving receives when the receiving has been executed during the warning mode, and printing the print data stored in the storing, linked with time to release the warning mode.

According to the present invention, business operation runs smoothly without any troubles due to delay of printing and a leakage of information contained in a printed material is properly prevented.

The object above, other objects, features and advantages of the present invention will become more apparent from the detailed description of the following embodiments given with reference to the drawings.

DETAILED DESCRIPTION

First Embodiment

Figure 1:
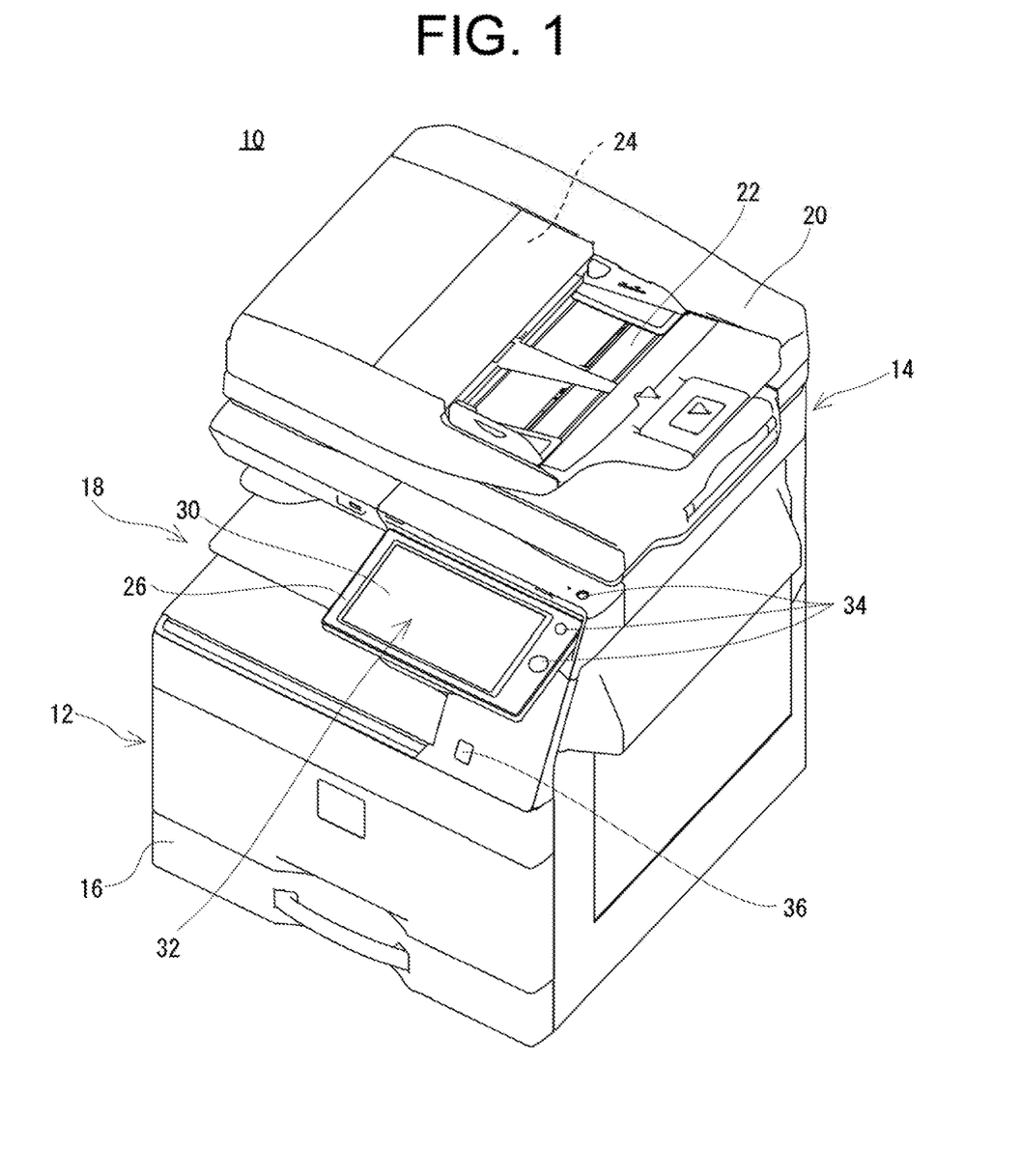
FIG. 1 is a perspective view illustrating an example of an external configuration of an image forming device according to an embodiment of the present invention, as viewed diagonally from above.

The image forming apparatus 10, an example of the present invention, forms a multicolor or single-color image on a predetermined paper sheet (recording medium), referring to FIG. 1. As described below, the image forming apparatus 10 includes a warning mode to be set in a power-saving state during the night and in the other state while the image forming apparatus 10 is in an operation mode. In the warning mode, a human detection sensor 36 detects a person, and then the image forming apparatus 10 determines the person as an intruder. The image forming apparatus 10 sends, via an electronic mail to a predetermined terminal (an external device), a message indicating that the intruder has been detected. Also, the image forming apparatus 10 issues an alert, and for example, audio is issued from a speaker 60, indicating that the intruder has been detected.

First, the basic configuration of the image forming apparatus 10 will be briefly described. In the first embodiment, a front-rear direction (a depth direction) of the image forming apparatus 10 and a front-rear direction (a depth direction) of a constituent member of the image forming apparatus are defined when a surface facing a position of a user (i.e., a surface on which an operation unit 26 is arranged as a front surface) designated as a front surface. Also, a left-right direction (a width direction) of the image forming apparatus 10 and a left-right direction (a width direction) of a constituent member of the image forming apparatus 10 are defined based on the user's view of the image forming apparatus 10.

The imaging forming apparatus 10 is an MFP including a printer function, a facsimile function, a copying function, a scanning function, and the like, as illustrated in FIG. 1 in the first embodiment. The image forming apparatus 10 includes an image forming unit 12 and an image reader 14 which is arranged on the image forming unit 12.

The image forming unit 12 includes an exposure unit, a developer, a photosensitive drum, a charger, an intermediate transfer belt, a transfer roller, a fixing unit, and the like. The image forming unit 12 forms an image, by an electrophotography, on a sheet which a sheet feeding mechanism conveys from a sheet feeding cassette 16, arranged below, and the like.

The image forming unit 12 forms an electrostatic latent image on the photosensitive drum, corresponding to the image by the charger, the exposure unit, and the like. The developer visualizes the electrostatic latent image formed on the photosensitive drum with toner. The toner image formed on the photosensitive drum is transferred to the sheet by the intermediate transfer belt, transfer roller, and the like, and the toner image transferred on the sheet is thermally fixed by the fixing unit. Then, the sheet after image formation is discharged to an internal discharge unit 18. An image data such as an image data which the image reader 14 has read or an image data which the external device has sent is used as an image data (a print data) for forming an image on a sheet.

The image reader 14 includes a housing. A document placement table, which is made of a transparent material, is arranged on an upper surface of the housing. The housing includes a light source, a plurality of mirrors, an image forming lens, a line sensor, and the like. The image reader 14 uses the light source to expose the surface of the document with light and uses the plurality of mirrors to guide reflected light, which is reflected from the surface of the document, to the image forming lens. The reflected light is imaged on a light-receiving element of the line sensor by the imaging forming lens. The line sensor detects luminance or chromaticity, respectively of the reflected light imaged on the light-receiving element. Then, the image data is formed based on the image of the surface of the document. A charger coupled device (CCD), a contact image sensor, or the like is used for a line sensor.

A document holding cover 28 is attached to the upper surface of the housing of the image reader 14 via a hinge arranged in the back and the like. The document holding cover 28 is opened and closed freely. An automatic document feeder (ADF) is arranged on the document holding cover 28. A document is placed on a document placement tray 22. The ADF automatically feeds every sheet of the document to a position where the image reader 14 reads the document.

In addition, the operation unit 26 is arranged on a front surface of the housing of the image reader 14. The operation unit 26 is called an operation device, an operation panel, and the like. The operation unit 26 has a horizontally long rectangle-plate shape. The operation unit 26 inclines downward toward the front side so that the user easily sees the upper surface of the operation unit 26. The top end of the operation unit 26 is attached to the housing of image reader 14 so that the operation unit 26 can rotate on the top of the operation unit 26.

A display 30 having a touch panel 32 is arranged on an upper surface of the operation unit 26. The display 30 is a general-purpose display such as a liquid crystal display (LCD) and an electro-luminescence (EL) display. Also, the display 30 is a general-purpose touch panel such as an electrostatic capacitance type, a resistance file type, an electromagnetic induction type, and an infrared ray type. The touch panel 32 is arranged on the display 30 in the first embodiment, but touch panel 32 and the display may be integrated to form a touch-panel display.

A plurality of hardware keys (operation buttons) such as a home button, a power-saving key, and a power button are arranged on the upper surface of the operation unit 26 and the upper surface of the housing of the image reader 14. The home button is a button for displaying a home screen on the display 30. The power-saving key is a button for shifting a normal state to a power-saving state or for shifting (restoring) the power-saving state to the normal state. The power button is a button for turning on or turning off power for the image forming apparatus 10.

In addition, the human detection sensor 36 is arranged to a front surface of the housing of the image forming unit 12. A pyroelectric sensor (an infrared ray sensor) is used as the human detection sensor 36 and detects the presence of a person when what has a difference temperature from an ambient temperature has moved within a detection range.

A position of the human detection sensor 36 can be appropriately changed. For example, the human detection sensor 36 can be arranged on the front surface of the housing of the image reader 14. A distance sensor using a laser or ultrasound, or a digital camera (an image sensor) using a CCD or a complementary metal-oxide-semiconductor (CMOS) is used as the human detection sensor 36. The distance sensor can detect a person within a predetermined detection range based on a change of distance. When the image sensor is used as the human detection sensor 36, the image sensor can detect a person within a predetermined detection range based on a change of an image. For another example, a floor sensor (a pressure sensor) connected with the image forming apparatus 10 can be used as the human detection sensor 36. In this case, the floor sensor is arranged on a floor surface within a predetermined range in front of the image forming apparatus 10. The image forming apparatus 10 (CPU 50) determines whether a person exists within the predetermined range in front of the image forming apparatus 10, based on an output of the floor sensor.

Although illustrated in FIG. 1, a controller 40 (see FIG. 2) having CPU 50 and the like is built in a predetermined position of the image forming apparatus 10. The controller 40 sends a control signal to each device and makes the image forming apparatus 10 execute various operations. The controller 40 sends data to the external device (equipment) connected to communicate and receives data from the external device (equipment) connected to communicate.

Figure 2:
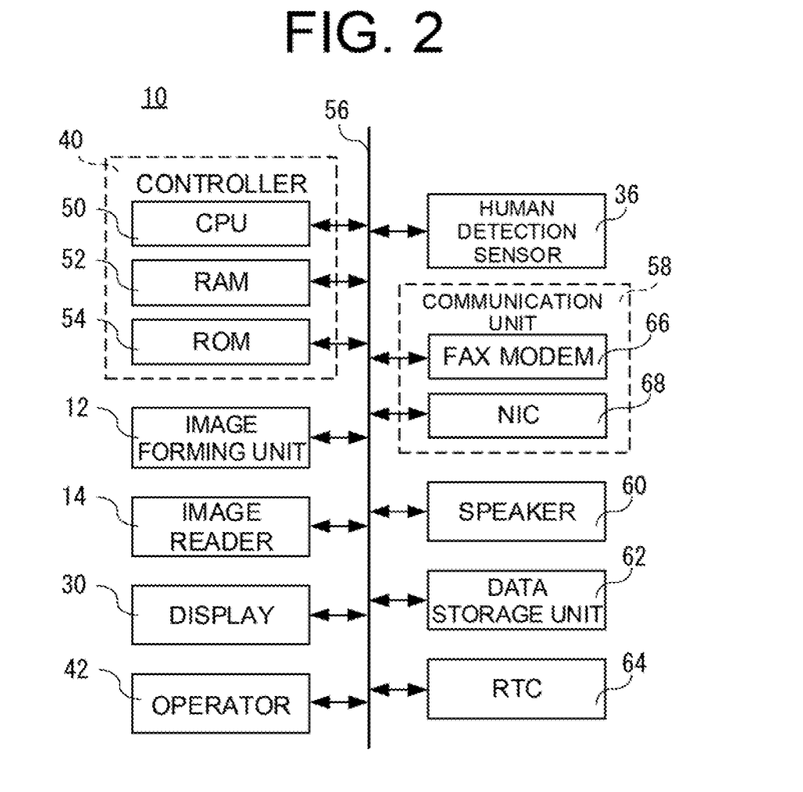
FIG. 2 is a block diagram illustrating an example of an electrical configuration of the image forming device illustrated in FIG. 1.

FIG. 2 is a block diagram illustrating an example of an electrical configuration of the image forming apparatus 10. Some components, which does not directly relate to the present invention, are omitted.

The image forming apparatus 10 includes the controller 40 having a CPU 50, a RAM 52, a read only memory (ROM) 54, and the like, as illustrated in FIG. 2. The image forming unit 12, the image reader 14, and the display 30, each of which is mentioned above, and an operator 40 are connected with the CPU 50 via a bus 56. Also, a communication unit 58, a speaker 60, a data storage unit 62, and an RCT 64 are connected with the CPU 50 via the bus 56.

The CPU 50 obeys a program stored in the ROM 54 and integrally controls the image forming apparatus 10. The CPU 50 executes a warning control processing and the print control processing in the first embodiment. The RAM 52 is used as a working area or a buffer area for the CPU 50. The ROM 54 stores a program which the CPU executes, proper information (model name, serial number) of the image forming apparatus 10, and the like. The image forming unit 12 and the image reader 14 are not explained again here because both have been already mentioned above.

The display 30 is a general-purpose monitor such an LCD and is connected with a CPU 50 via a display control circuit which is not illustrated. The display control circuit includes a graphic processing unit (GPU), a video random access memory (VRAM), and the like. Under an instruction of the CPU 50, the GPU uses an image generation data 104b stored in a RAM 52 (see FIG. 6), generates a display image data for displaying various images on the display 30 in the VRAM, and outputs a generated display image data on the display 30. Therefore, a home screen as a screen for a user to select a job which the user wants from various jobs the image forming apparatus 10 can execute, a setting screen as a screen for the user to set which function of the image forming apparatus 10 is used or not used and to set a detail, an operation screen for the user to operate/manipulate the image forming apparatus 10, a status (an operation state), various messages, and the like are displayed on the display 30.

The operator 42 is a user interface to receive the user's operation and includes the touch panel 32, the hardware key

34. The touch panel 32 detects a touch operation (a touch input) within a touch effective range and outputs touch coordinate data, showing a position of the touch input, in the CPU 50. The hardware key 34 includes various keys or various buttons such as the home button, the power-saving key, the power button, and the like. In the first embodiment, the home button and the power-saving key are electrostatic capacitive hardware keys that detects the user' operation based on a change of electrostatic capacitance. The power button is a mechanical hardware key that detects the user's operation based on a switch of a mechanical contact state.

The human detection sensor 36 is a monitor detector which an infrared ray is applied. The CPU 50 detects the presence of a people within a predetermined range based on an output of the human detection sensor 36.

The communication unit 58 is an interface for communicating with the external device and includes a FAX modem 66 and a network interface card (NIC) 68. The FAX modem 66 is a communication circuit for sending and receiving FAX data with the external device via a public telephone line. The NIC 68 is a communication circuit for communicating (for example, sending and receiving printer data and an electronic mail) with the external device via a network such as a local area network (LAN) and an internet.

The speaker 60 is connected with the CPU 50 via an audio integrated circuit (IC), which is not illustrated. The audio IC obeys an instruction of the CPU 50, reproduces audio data, and outputs reproduced audio data from the speaker 60. Therefore, sound or audio (synthesize audio), each of which corresponds to the audio data, is output from the speaker 60.

The data storage unit 62 is a general-purpose storage device such as a hard disk drive (HDD) and an electrically erasable programmable read-only memory (EEPROM). The data storage unit 62 stores print data such as received FAX data and received printer data from the external device.

A real-time clock (RTC) 64 is a timepiece circuit that counts time (including year, month, day, hour, minute, second). Although a detail description is omitted, a day of the week is also known based on a calendar function.

This configuration of the image forming apparatus 10 is placed at a predetermined position in an office, for example. For the image forming apparatus 10, power is turned on during business operation time. And the image forming apparatus 10 works in the normal state (a normal mode) during the business operation time. In the normal state, the image forming apparatus 10 properly copies, prints, sends a facsimile, receives a facsimile, sends an electronic mail, and receives an electronic mail. However, the image forming apparatus 10 shifts to the power-saving state (a power-saving mode) when the power-saving button is turned on or when the image forming apparatus 10 has not been used for a predetermined period. While the image forming apparatus 10 is not used, for example out of the business operation time, power is turned off and a power-conservation state (a power-conservation mode), in which power consumption is reduced to the lowest, is set for the image forming apparatus 10.

The image forming apparatus 10, according to the first embodiment, can set the warning mode. Therefore, the image forming apparatus 10 sets the warning mode while a user is not be around the image forming apparatus 10, for example during the power-saving state during the night, and is used as a security device which detects an intruder and issues the alert.

In the first embodiment, a manager (a user who has management authority) presets a period during which the warning mode is on, linked with the business operation time of a user who uses the image forming apparatus 10. The manager presets a period out of the use's business operation time as a period during which the warning mode is on so that the manager can prevent him/her from forgetting to set the warning mode and can check a printed material when the business operation starts as described below. To preset the period during which the warning mode makes the business operation runs efficiently.

Figure 3:
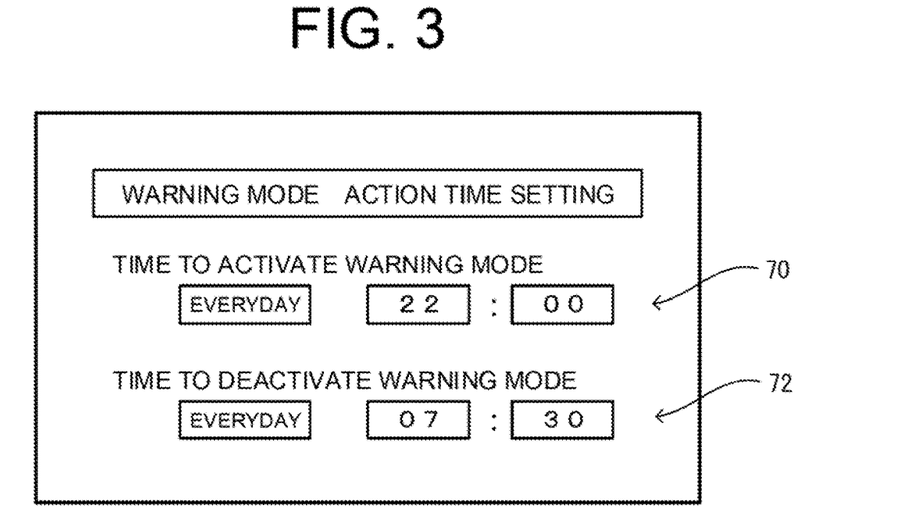
FIG. 3 is a diagram illustrating an example of a warning mode setting screen.

FIG. 3 is a diagram illustrating an example of a warning mode setting screen for the manager to set the period during which the warning is on. The warning mode setting screen is displayed on the display 30 according to the manager's operation. As illustrated in FIG. 3, the warning mode setting screen includes a setting area 70 and a setting area 72. The setting area 70 is area for the manager to set time and day of the week (date) to activate the warning mode. In an exemplary embodiment of FIG. 3, the warning mode is activated at 22:00 every day. The setting area 72 is area for the manager to set time and day of the week (date) to release the warning mode. In the exemplary embodiment of FIG. 3, the warning mode is released at 7:30 am every day. In addition, although not illustrated, the manager can input an electronic mail address of a destination of a warning message (for example, a terminal for the manager) on the warning mode setting screen.

A user can manually change the period during which the warning mode is on in the first embodiment. The user may include a user who does not have management authority.

Figure 4:
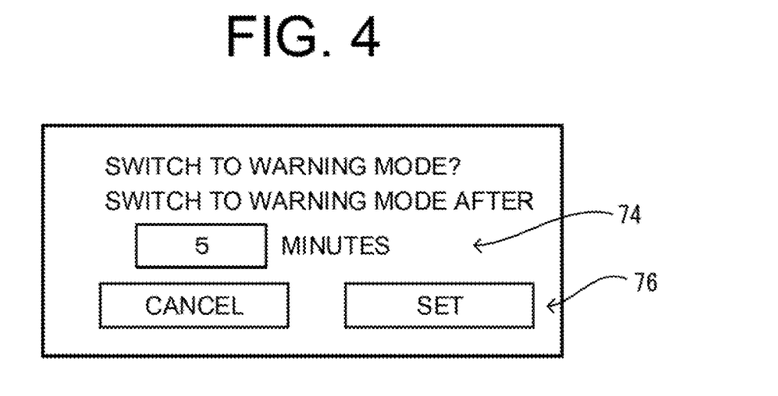
FIG. 4 is a diagram illustrating an example of a warning mode manual setting screen.

FIG. 4 is a diagram illustrating an example of a warning mode manual setting screen for the user to manually shift a mode to the warning mode. When the user selects the warning mode manual setting button displayed on the display 30, the warning mode manual setting screen is displayed on the display 30. The warning mode manual setting screen includes a setting area 74 and a setting area 76, as illustrated in FIG. 4. The setting area 74 is an area for the user to set predetermined time since the user presses a setting button until the warning mode is activated. In FIG. 4, five minutes is set as a default value, for example. If the warning mode is activated at the same time when the user presses the setting button, the user who has input time may be detected as an intruder by mistake. The setting area 74 is used for warding off the misdetection. The setting area 76 includes the setting button and a cancel button. When the user has pressed the setting button and the time set in the setting area 74 has elapsed, the image forming apparatus 10 shifts to the warning mode.

Figure 5:
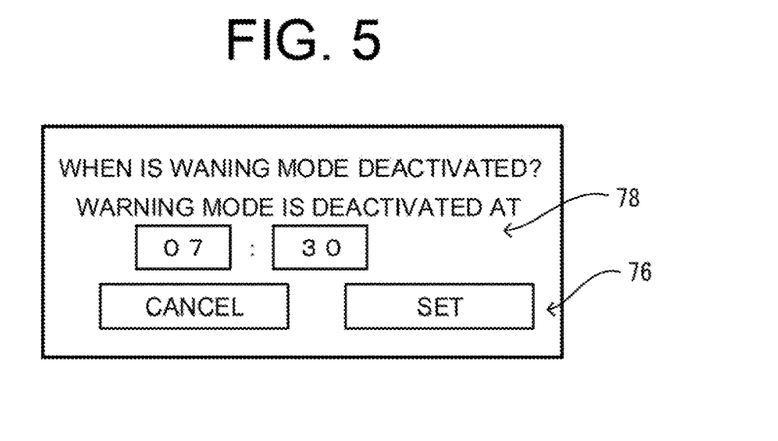
FIG. 5 is a diagram illustrating another example of a warning mode manual setting screen.

Time to release the warning mode may be set on the warning mode manual setting screen, as illustrated in FIG. 5. In this case, the warning mode setting screen includes a setting area 78 for the user to set time to release the warning mode.

As described above, the image forming apparatus 10 shifts to the warning mode when the user has set the period during which the warning mode is on and the time to activate the warning mode has come. In the warning mode, the image forming apparatus 10 uses functions included in the image forming apparatus 10, detects the presence of an intruder at a position (a place or an area) where the image forming apparatus 10 has been placed, and issues the alert to other devices (the terminal for the manager in the first embodiment) and around the image forming apparatus 10.

For example, when the human detection sensor 36 has detected a person, the image forming apparatus 10 determines the person as an intruder and sends an electronic mail including the alert message, indicating that the intruder has been detected, to the preset destination (the terminal for the manager). The alert message includes a text sentence that the intruder has been detected and proper information about the image forming apparatus 10 that has detected the intruder. The proper information about the image forming apparatus 10 includes a device name and a machine code, each of which the user or the manager of the image forming apparatus 10 has assigned to the image forming apparatus 10, as well as the proper information (the model name and the serial number) stored in a ROM 54. The position where the image forming apparatus 10 has been placed is recorded corresponding to the proper information, so that the image forming apparatus 10 as a source of the alert message can be specified and the position where the image forming apparatus 10 has been placed can be specified, based on the alert message. Therefore, a position where the intruder has been detected can be specified.

The image forming apparatus 10 outputs audio (alert audio) or alert sound, each of which indicates that the intruder has been detected, from the speaker 60 so that the image forming apparatus 10 issues the alert, repeatedly for a predetermined period, around the image forming apparatus 10. An alerting method in the warning mode can be appropriately changed.

An anti-crime system can be introduced with low cost and without any difficulties because of the image forming apparatus 10 equipped with the warning mode.

However, if an intruder actually breaks in and a printed material such as FAX reception or printer reception is left in the image forming apparatus 10, the intruder may take away the printed material and may look in the content of the printed material. Then, confidential information or personal information, each of which the printed material contains, may be leaked.

The image forming apparatus 10 receives print data such as FAX data and printer data from the external device, and temporarily stores the print data in the data storage 62. The image forming apparatus 10 executes the print processing of the stored print data, linked with the time to release the warning mode. The image forming apparatus 10 does not execute the print processing of the received print data during the warning mode and starts the print processing when the warning modes has been released. Therefore, if an intruder breaks in during the warning mode, this print processing can prevent the intruder from taking away a printed material from being taken away and can prevent confidential information and the like from being leaked or lost. Only to store the print data may delay printing and may deter business operation, but to execute the print processing linked with the time to release the warning mode can prevent the delay of printing from deterring the business operation.

Figure 6:
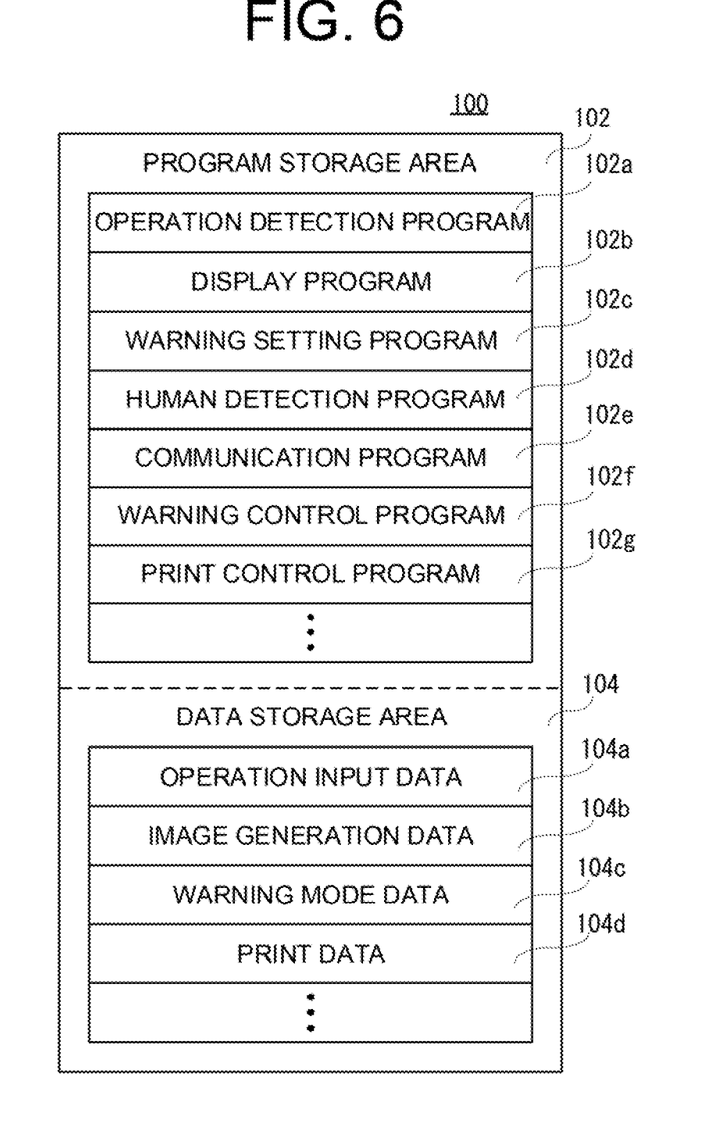
FIG. 6 is a diagram illustrating an example of a memory map of random access memory (RAM).

FIG. 6 is a diagram illustrating an example of a memory map 100 of the RAM 52 illustrated in FIG. 2. The RAM 52 includes a program storage are 102 and a data storage are 104. The program storage are 102 stores an operation detection program 102a, a display program 102b, a warning setting program 102c, a human detection program 102d, a communication program 102e, a warning control program 102f, a print control program 102g, and the like.

The operation detection program 102a detects operation input data which are input according an operation of the operator 42 including the touch panel 32 and the hardware key 34 and stores the operation input data in the data storage area.

The display program 102b generates display image data corresponding to various screen such as the warning mode setting screen and outputs (displays) generated display image data on the display 30.

The warning setting program 102c determines or changes various settings for the warning mode on the warning mode setting screen and the like displayed on the display 30 according to the user's operation. The warning mode setting screen and the like are displayed on the display 30 according to the display program 102b.

The human detection program 102d detects the presence of a person within the predetermined range set around the image forming apparatus 10.

The communication program 102e communicates (sends and receives) data with the external device. The human detection program 102e includes a program that uses a FAX modem and executes facsimile communication and a program that uses a NIC 68 and executes network communication.

The warning control program 102f detects the presence of a people based on the output of the human detection sensor 36. When a person has been detected, the warning control program 102f executes warning control processing to issue the alert that an intruder has been detected around a predetermined external device and the image forming apparatus 10.

The print control program 102g controls operation of the image forming unit 12 and executes the print control program to print an image corresponding to print data (image data) on recording paper and the like. The print control program 102g includes a program that appropriately applies image processing to the received print data and stores the image-processed print data when print data (FAX reception data, printer data, and the like has been received from the external device during the warning mode. Also, the print control program 102g includes a program that determines timing to use the stored print data and to execute the print process.

The program storage area 102 stores other programs such as a program to execute various functions on the CPU 50. The other programs are not illustrated.

The data storage area 104 of the RAM 52 stores an operation input data 104a, an image generation data 104b, a warning mode data 104c, a print data 104d, and the like.

The operation input data 104a is touch coordinate data or/and operation data, each of which the operation detection program 102a has detected. The data storage area 104 stores the detected touch coordinate data or/and the detected operation data in time sequence.

The image generation data 104b includes polygon data, texture data and the like to be used for generating image data for various screen such as the warning mode setting screen displayed on the display 30.

The warning mode data 104c is data for setting the warning mode. Specifically, the warning mode data 104c includes the data set on the warning mode setting screen and the like, as illustrated in FIG. 4, for example, the time and the day of the week to activate the warning mode, the time and the day of the week to release the warning mode, and the like.

The print data 104d is the image data received from the external device, for example FAX data and printer data, and an image data the image reader 14 has read.

The data storage are 104 stores other data required to execute integrated control processing for the image forming apparatus 10 and includes a timer (a counter) and a register required to execute the integrated control processing. The timer and the register are not illustrated in FIG. 6.

Figure 7:
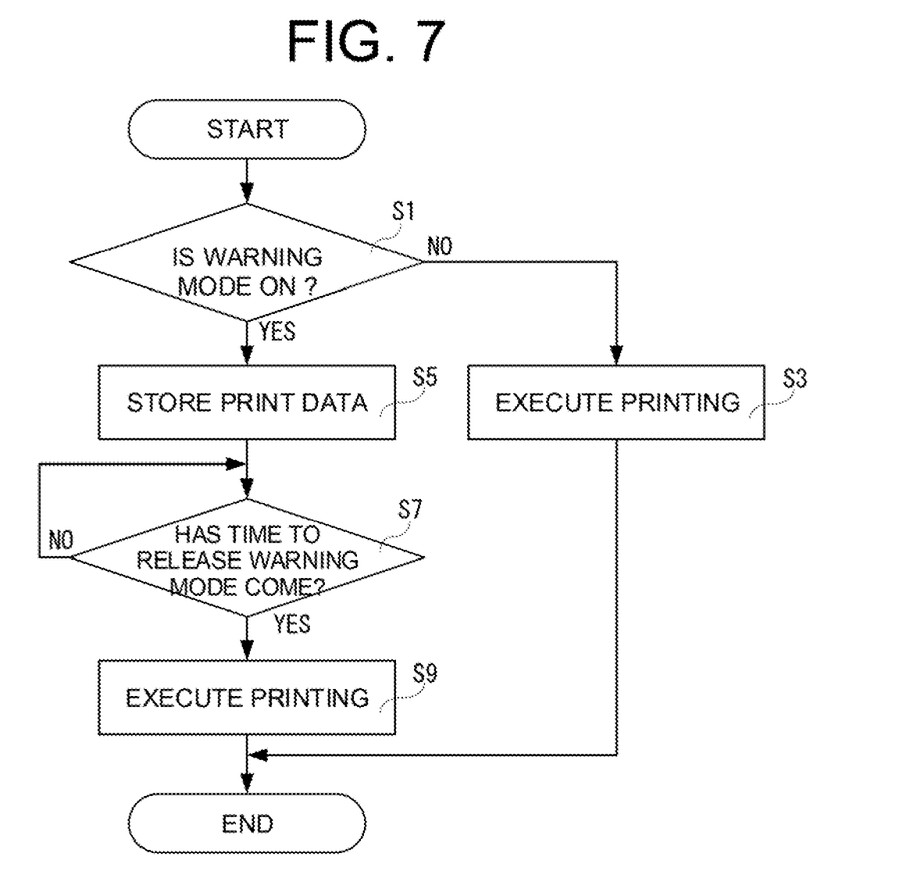
FIG. 7 is a diagram illustrating an example of print control processing in a central processing unit (CPU).

FIG. 7 is a diagram illustrating an example of the print control processing of the CPU 50. For example, the CPU 50 starts the print control processing when the CPU 50 has received FAX data (print data) from the external device. Also, the CPU 50 starts the print control processing when the CPU 50 has received printer data from the external device.

As illustrated in FIG. 7, when the CPU 50 has received the print data from other FAX devices and has started the print control processing, whether the warning mode is on is determined in step S1. If the warning mode is off ("NO" in step S1), the processing proceeds to step S3. In step S3, the CPU 50 sends a control signal to the image forming unit 12 and the like, executes the print processing for the received print data, and ends the print control processing.

On the other hand, if the warning mode is on ("YES" in step S1), the processing proceeds to step S5. In step S5, the received print data is stored. The CPU 50 analyses the received data, appropriately applies the image processing such as conversion and compression to the print data, and then stores the image-processed print date in the date storage unit 62.

In step S7, whether the time to release the warning mode has come is determined. If the time to release the warning mode has not come yet ("NO" in step S7), the processing stands by until the time to release the warning mode has come. If the time to release the warning mode has come ("YES" in step S7), the warning mode is released and the processing proceeds to step S9.

In step S9, the CPU 50 the print processing for the print data stored in the data storage unit 62. The CPU 50 sends the control signal to the image forming unit 12 and the like and executes the print processing for the print data stored in the data storage unit 62. After completion of printing, the CPT 50 deletes the print data stored in the data storage unit 62 and then ends the print control processing.

As described above, according to the first embodiment, the print processing for the print data received during the warning mode is not executed during the warning mode. When the warning mode has been released, the print processing starts. The first embodiment can prevent the delay of printing from deterring the business operation and can properly prevent the information in the print material from been leaked.

Second Embodiment

Figure 8:
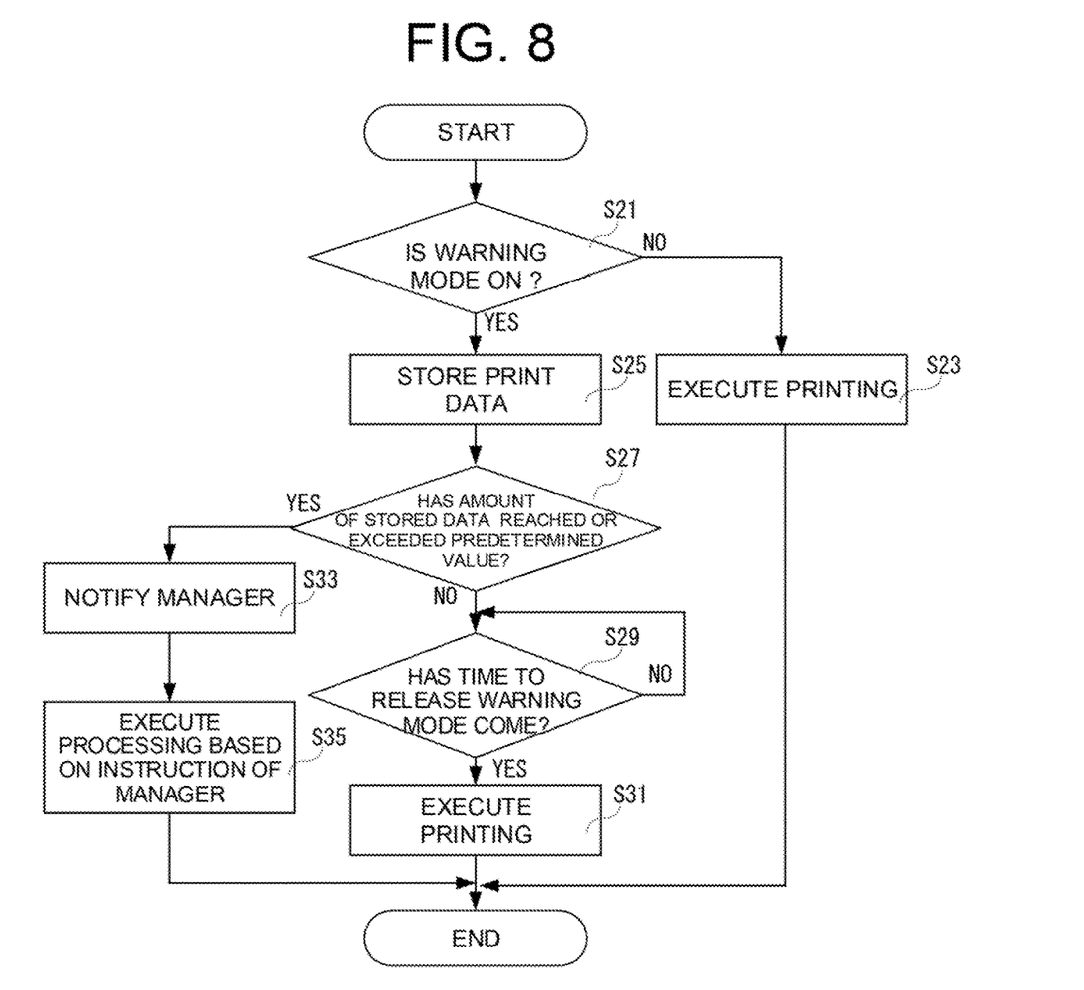
FIG. 8 is a flow chart illustrating an example of the print control processing in a CPU which an image forming apparatus includes according to a second embodiment of the present invention.

Next, the image forming device 10 as the second embodiment of the present invention is described, referring to FIG. 8. The image forming apparatus 10 has a function to notify a manager when an amount of stored print data has increased and free space in the data storage unit 62 has lessened, in the second embodiment which is different from the first embodiment. In addition, the manager can remotely control the image forming apparatus 10 from the terminal for the manager, in the second embodiment. The others are not different between the first and the second embodiment, and so overlapping explanation with the first embodiment is omitted or simplified.

In the second embodiment, an amount of the stored print data is calculated when the print data received during the warning mode has been stored in the data storage unit 62. When the amount of stored data has reached or has exceeded a predetermined value (for example, 80% of space of the data storage unit 62), an electronic mail including a notification message about the status of the data storage unit 62 is sent to other preset devices (the terminal for the manager in the second embodiment). Addition information such as a number of the stored print data, data information, the time to release the warning mode may be sent together with the notification message to the terminal for the manager.

For example, when manager has determined that some stored print data can be printed base on the sent information and the like, the manager requires the image forming apparatus 10 to send the print data which can be printed. The image forming apparatus 10 obeys the requirement and sends the print data which can be printed to the terminal for the manager. When the manager has checked content of the print data and has determined that the print data possesses no confidentiality, the manager requires the image forming apparatus 10 to execute the print processing for the print data which possesses no confidentiality. The image forming apparatus 10 obeys the requirement, executes the print processing the print data which possesses no confidentiality, and deletes the print data which for which the print processing has been executed. This print processing can ward off a failure to receive the print data due to a shortage in the free space of the data storage unit 62.

When some users can to the place where the image forming apparatus 10 has been placed before the preset time to release the warning mode, the manager can move up the time to release the warning mode and can instruct the image forming apparatus 10 to execute the print processing for the store print data. In addition, the manager can instruct the image forming apparatus 10 to transfer the stored print data to other storage devices.

FIG. 8 is a flow chart illustrating an example of the print control processing in the CPU 50. As illustrated in FIG. 8, the CPU receives the print data from the external device and starts the print control processing. Then, in step S21, the CPU 50 determines whether the warning mode is on. If the warning mode is off ("NO" in step S21), the processing proceeds to step S23. The CPU 50 executes the print processing for the received print data and ends the print control processing.

On the other hand, if the warning mode is on ("YES" in step S21), the processing proceeds to step S25. The CPU 50 stores the received print data. In step S27, whether the amount of the stored data has reached or has exceeded the predetermined value. Here, the CPU 50 determines whether the amount of the stored data has reached or has exceeded 80% of the space of the data storage unit 62. If the amount of the stored data has not reached the predetermined value ("NO" in step S27), the processing proceeds to step S29. In step S29, the CPU 50 determines whether the time to release the warning mode has come. If the time to release the warning mode has come ("YES" in step S29), the processing proceeds to step S31. The CPU 50 executes the print processing for the print data stored in the data storage unit 62 and ends the print control processing.

If the amount of the stored data in the data storage unit 62 has reached or has exceeded the predetermined value ("YES" in step S27), the processing proceeds to step S33. In step S33, the CPU 50 notifies the manager of the status of the data storage unit 62. The CPU 50 sends a notification message that the amount of the stored data has reached or has exceeded the predetermined value to the terminal for the manager. Also, additional information such as a number of the print data stored in the data storage unit 62 and the time to release the warning mode is sent to the terminal of the manager.

In step S35, the CPU 50 executes the processing based on the instruction of the manager. For example, when the manager has required the image forming apparatus 10 to send the print data, the CPU 50 sends the print data to the terminal for the manger. When the manager has required the image forming apparatus 10 to print the print data, the CPU 50 executes the print processing for the print date and deletes the print data which for the print processing has been executed. The CPU 50 ends the print control processing when the manager does not give other instruction after the processing in step S35 has been completed or a predetermined period has elapsed.

The second embodiment has a similar effect to the first embodiment and can prevent the delay of printing from deterring the business operation and can properly prevent the information in the print material from been leaked.

According to the second embodiment, when the amount of the data stored in the data storage unit 62 has reached or has exceeded the redetermined value, the manager and the like can take proper action because the other devices are notified of the status the data storage unit 62. Therefore, this print processing can ward off the failure to receive the print data due to the shortage of the free space in the data storage unit 62.

The predetermined value (threshold) of the stored data when the other devices are notified is defined as 80% of the space of the data storage unit 62 in the second embodiment. But the predetermined value can be changed. The predetermined value can be changed according to time until the time to release the warning mode (the predetermined value can be defined larger when the time to release the warning mode is coming). For example, the predetermined value can be defined as 80% until a first time and can be automatically changed to 90% after the first time.

As described in the second embodiment, the manager is notified when the free space in the data storage unit 26 runs short. However, all of or a part of the stored print data may be automatically transferred to the other devices, instead of or together with the notification of the shortage in the free space in the data storage unit 62.

Third Embodiment

Subsequently, the image forming device 10 as the third embodiment of the present invention is described, referring to FIG. 9. Timing when the print processing for the stored print data in the third embodiment is different from the timing in the first embodiment. The others are not different for between the first and the third embodiment, and so overlapping explanation with the first embodiment is omitted or simplified.

In the third embodiment, time required to print based on an amount of the print data stored in the data storage unit 62 is calculated. The print processing is executed so as to end the print processing linked with the time to release the warning mode, based on the calculated print time. The print processing starts some hours, some minutes, or some seconds to be required to print before the time to release the warning mode.

However, the print processing is not executed when the human detection sensor 36 has detected a person and the image forming apparatus 10 has determined the person as an intruder while the print processing is performed. When print date reception has occurs more than one time during the warning mode, the time to be required to print is accumulated every print date reception. The time to be required to print is updated based on an amount of stored print data at the last reception of print data. The timing to start print the print data is determined.

Figure 9:
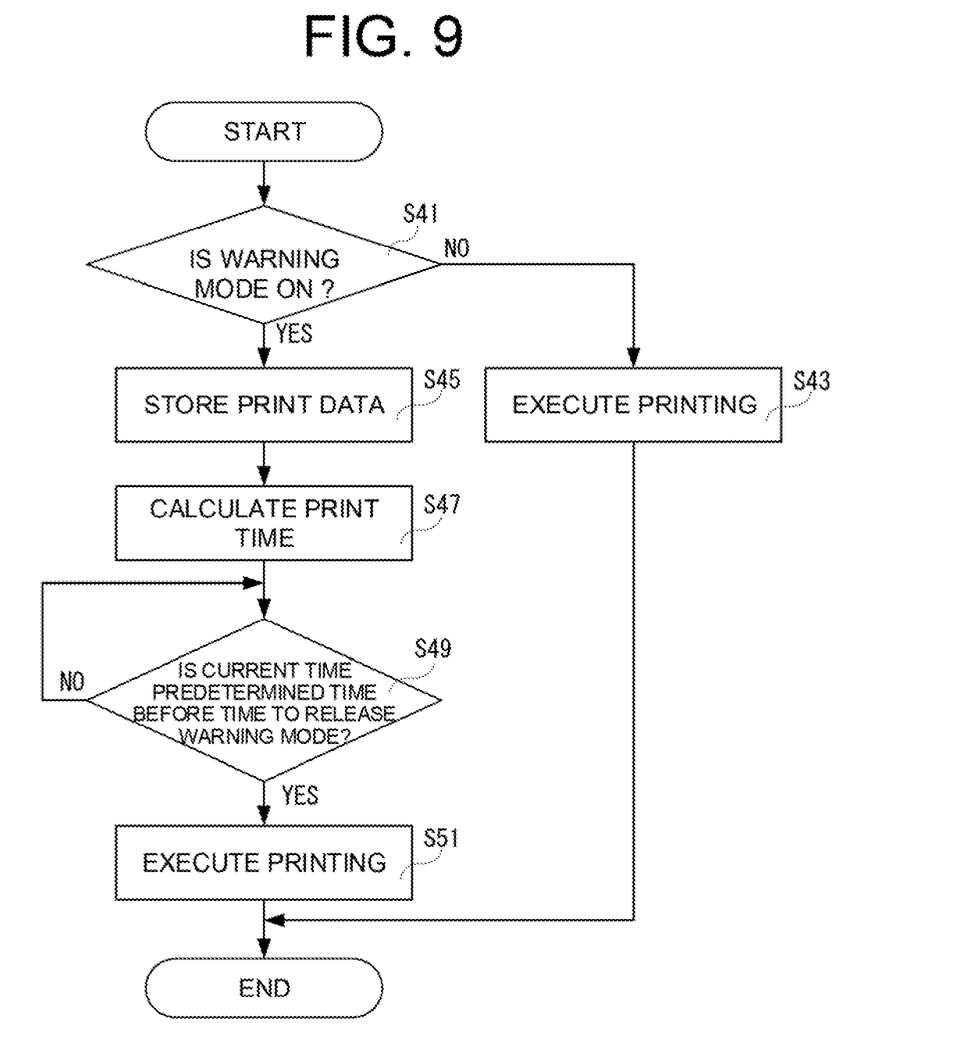
FIG. 9 is a flow chart illustrating an example of the print control processing in a CPU which an image forming apparatus includes according to a third embodiment the present invention.

FIG. 9 is a flow chart illustrating an example of the print control processing in the CPU 50 in the third embodiment. As illustrated in FIG. 9, when the CPU 50 has received the print data from the external device and has started the print control processing, the CPU 50 determines whether the warning mode is on in step S41. If the warning mode is off ("NO" is step S41), the processing proceeds to step S43. The CPU 50 executes the print processing for the received print data and ends the print control processing.

On the other hand, if the warning mode is off ("YES" in step S41), the processing proceeds to step S45. The CPU 50 stores the received print data. In step S45, the time to be required to print is calculated based on the amount of the print data stored in the data storage unit 62. In step S49, the CPU 50 determines whether the predetermined time before the time to release the warning mode has come. In other words, the CPU 50 determines whether the current time is the time to be required to print before the time to release the warning mode.

If the predetermined time before the time to release the warning mode has not come yet ("NO" in step S49), the processing stands by until the predetermined time before the time to release the warning mode has come. On the other hand, if the predetermined time before the time to release the warning mode has come ("YES" in step S49), the processing proceeds to step S51. In step S51, the CPU 50 executes the print processing for the print data stored in the data storage unit 62 and ends the print control processing. However, the CPU 50 does not execute the print processing when the human detection sensor 36 detects a person.

According to the third embodiment, the efficiency of the business operation increases because the print processing ends linked with the time to release the warning mode.

The print processing for all print date received during the warning mode is executed linked with the time to release the warning mode in each embodiment described above. But the presence of confidentiality of the print data may be determined and then the print processing may be executed. The print processing may be executed, linked with the time to release the warning mode, for the print data with confidentiality based on the determination. The print processing may be executed, whether or not during the warning mode, for the print data without confidentiality based on the determination. The image processing may determine the presence of confidentiality. For example, the image processing may detect a mark of confidentiality on the print data. If the mark of confidentiality is on the print data, the image processing may determine that the print data possesses confidentiality.

In the third embodiment described above, the print processing is executed linked with the time to release the warning mode irrespective of a type of the print data. But the type of the print data may be identified. Whether the print processing can be executed while the warning mode is released may be determined based on the type of the print data. Specifically, when the print data is stored, FAX data or printer data may be identified for the print data and may be stored. The print processing while the warning mode is released may be switched according to a setting of the image forming apparatus 10 the user has set (for example, printing only FAX data, print only printer data, printing both, or not print either).

The manager presets the period during which the warning mode is on in each embodiment described above. An appropriate method can be chosen for setting the period during which the warning mode is on. For example, the period during which the warning mode is on may be automatically set linked with control of a gateway. A state of the registered user's login may be monitored. The warning mode may be activated when nobody has logged in.

In addition, the print processing is executed linked with the preset time to release the warning mode. But a warning mode release signal is received from the external device so as to release the warning mode. when the waning mode release signal has been received, the warning mode may be released and the print processing may be executed linked with the release of warning mode. The print processing for stored print data may be executed linked with instruction to release the warning mode from the external device. This print processing can prevent the delay of printing from deterring the business operation and can properly prevent the information in the print material from been leaked.

The configuration of the electrophotography-type image forming apparatus 10, described above, is merely one of examples and can be appropriately changed according a specification of an actual product. For example, an image forming apparatus does not have to be an MFP but may be a print device or a facsimile device. Each embodiment described above illustrates the image forming apparatus 10 having the electrophotography-type imaging forming unit 12. But an image forming unit may be an inkjet-type image forming unit.

The specific value and the specific shape of the components described above are merely one of examples and can be appropriately changed according to necessity such as the specification of the product.

10 Image forming apparatus
12 Image forming unit
14 Image reader
30 Display
32 Touch panel
36 Human detection sensor
40 Controller
42 Operator
50 Central processing unit (CPU)
58 Communication unit
62 Data storage unit
64 Real-time clock (RTC)

The invention claimed is:

1. An image forming apparatus which includes a human detection sensor and can set a warning mode to issue an alert when the human detection sensor detects a person, the image forming apparatus comprising:
   a reception device that receives print data from an external device;
   a data storage device that stores the print data when the reception device has received the print data during the warning mode;
   a control device that executes print processing for the print data stored in the data storage device, linked with time to release the warning mode; and
   a confidentiality determination device that determines the existence of confidentiality for the print data stored in the data storage device,
   wherein the control device executes the print processing for the print data, linked with the time to release the warning mode, when the confidentiality determination device has determined that the print data possesses confidentiality, and
   wherein the control device executes the print processing for the print data, whether or not during the warning mode, when the confidentiality determination device has determined that the print data possesses no confidentiality.

2. The image forming apparatus according to claim 1, wherein a period, during which the warning mode is on, is preset to a predetermined period linked with business operation time of a user.

3. The image forming apparatus according to claim 1, wherein a period, during which the warning mode is on, can be changed.

4. The image forming apparatus according to claim 1, comprising a notification device that notifies other device when an amount of the print data, stored in the data storage device, has reached to or has exceeded a predetermined value.

5. The image forming apparatus according to claim 1, comprising a transfer device that transfers at least a part of the print data to other storage device when an amount of the print data, stored in the data storage device, has reached or has exceeded a predetermined value.

6. The image forming apparatus according to claim 1, wherein the control device starts the print processing when the warning mode has been released.

7. The image forming apparatus according to claim 1, comprising a print time calculation device that calculates time required for the print processing based on an amount of the print data stored in the data storage device,
   wherein the control device executes the print processing so that the print processing ends, linked with the time to release the warning mode, based on the time which the print time calculation device has calculated.

8. The image forming apparatus according to claim 1, comprising an identification device that identifies a type of the print data,
   wherein the control device determines whether the print processing is executed while the warning mode is released, based on the type of the print data which the identification device has identified.

9. An image forming apparatus which includes a human detection sensor and can set a warning mode to issue an alert when the human detection sensor detects a person, the image forming apparatus comprising:
   a reception device that receives print data and a warning mode release signal from an external device;
   a data storage device that stores the print data when the reception device has received the print data during the warning mode; and
   a control device that releases the warning mode and executes print processing for the print data stored in the data storage device, linked with time to release the warning mode, when the reception device has received the warning mode release signal.

10. A non-transitory computer-readable recording medium storing a print control program which an image forming apparatus executes, wherein the image forming apparatus includes a human detection sensor and can set a warning mode to issue an alert when the human detection device detects a person,
   the print control program causing a processor included in the image forming device to implement;
   receiving print data from an external device;
   storing the print data which the receiving has received when the receiving has been executed during the warning mode;
   printing the print data stored in the storing, linked with time to release the warning mode when print data is determined to possess confidentiality, and
   printing the print data stored in the storing, when the print data is determined to possess no confidentiality during the warning mode.

11. A print control method of an image forming apparatus which includes a human detection sensor and can set a warning mode to issue an alert when the human detection sensor detects a person, the print control method of the image forming apparatus comprising;
　　receiving print data from an external device;
　　storing the print data which the receiving has received when the receiving has been executed during the warning mode; and
　　printing the print data stored in the storing, linked with time to release the warning mode, when print data is determined to possess confidentiality, and
　　printing the print data stored in the storing, when the print data is determined to possess no confidentiality during the warning mode.

* * * * *